Nov. 21, 1939.   A. P. DE SEVERSKY   2,180,462
AIRCRAFT STRUCTURE
Filed Dec. 16, 1937   6 Sheets-Sheet 2
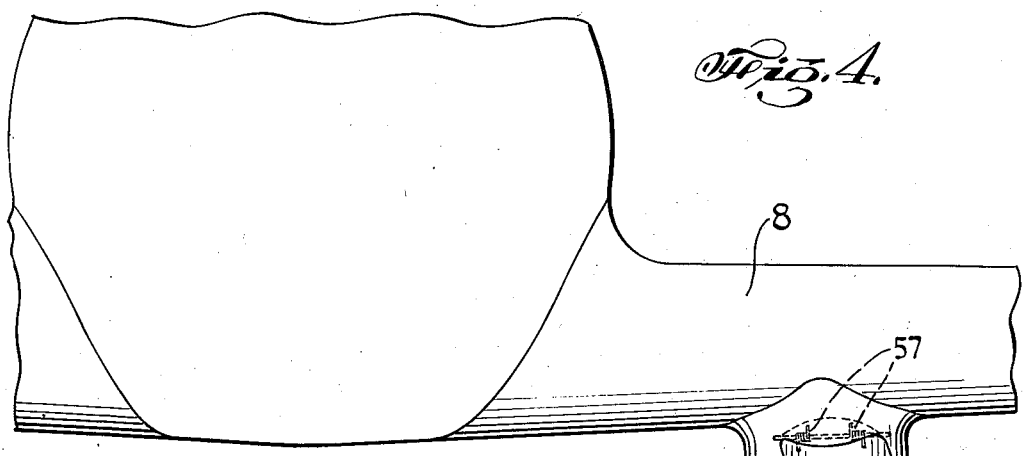
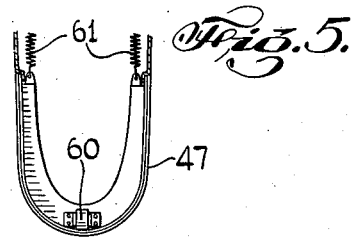
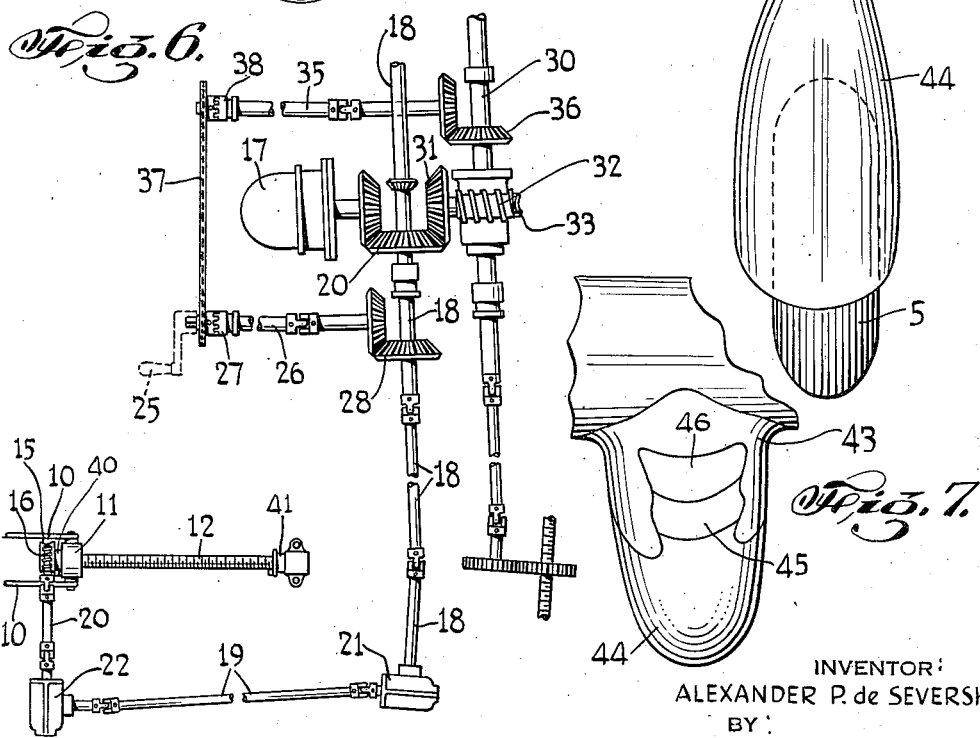
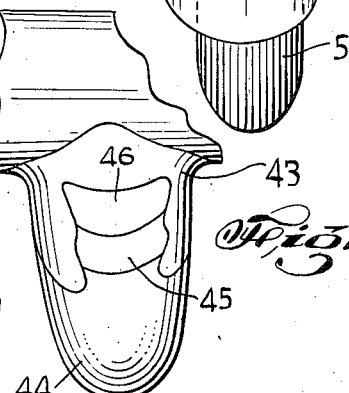
INVENTOR:
ALEXANDER P. de SEVERSKY;
BY
Robert C. Rasche
ATTORNEY.

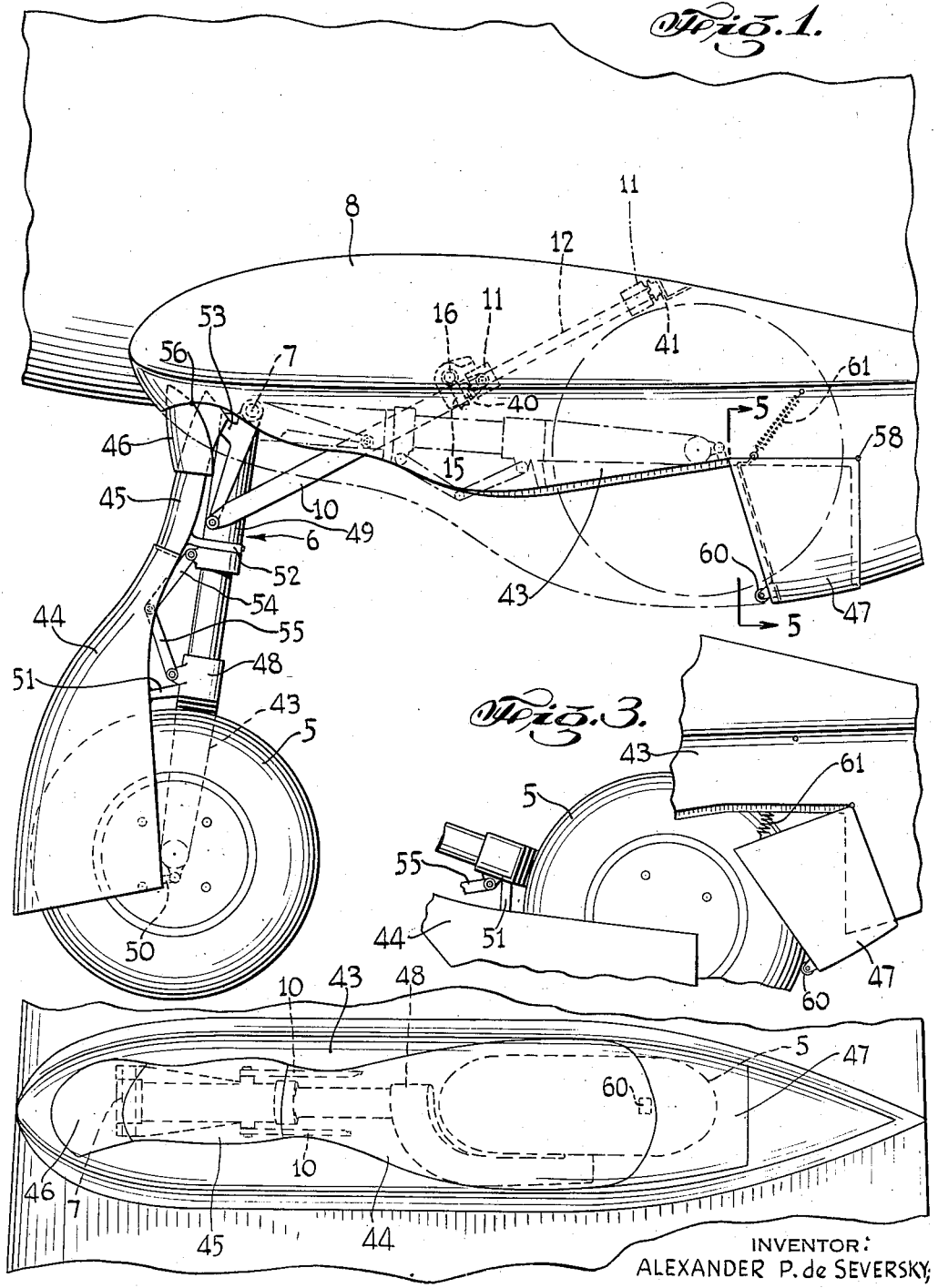

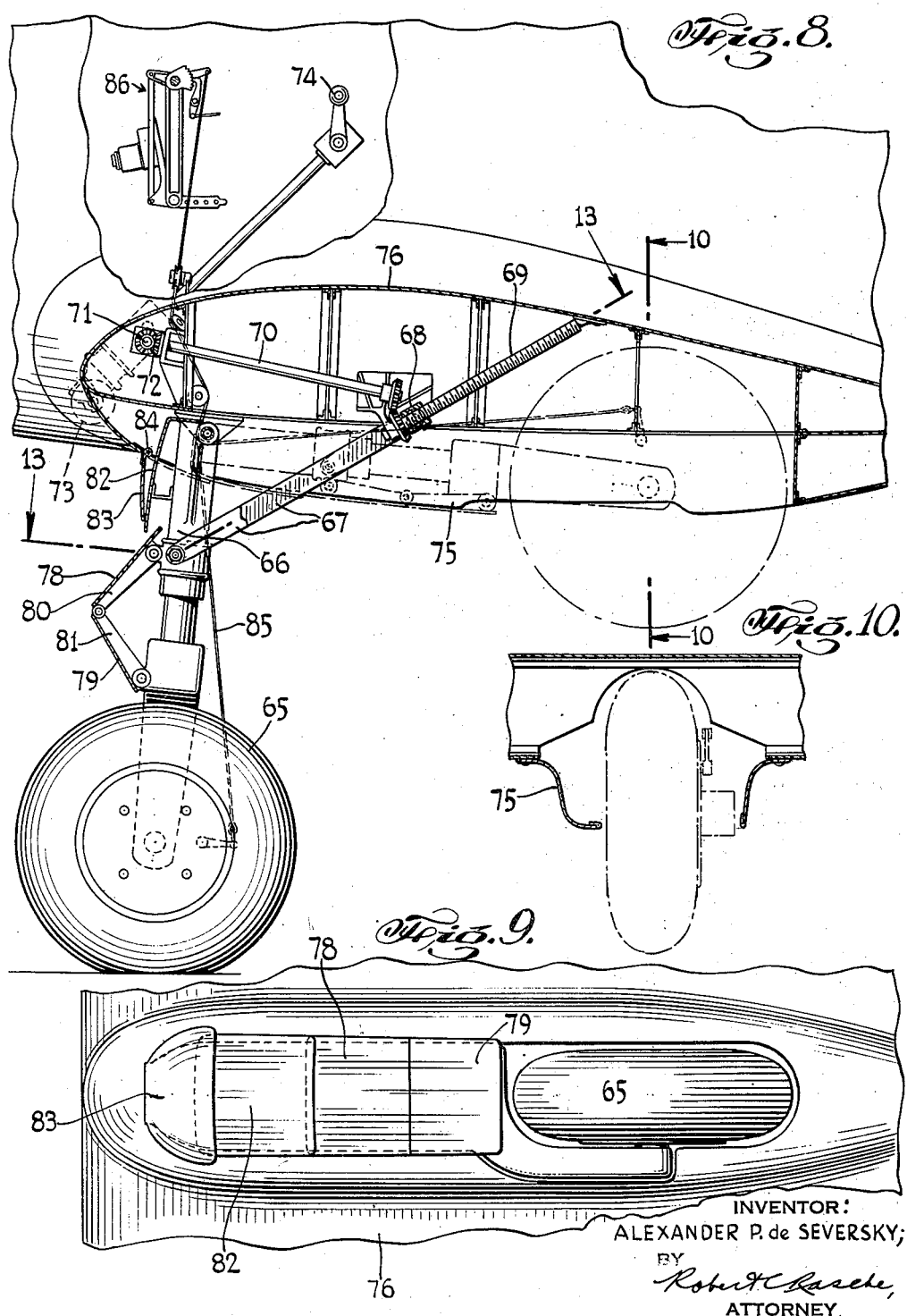

Nov. 21, 1939.  A. P. DE SEVERSKY  2,180,462
AIRCRAFT STRUCTURE
Filed Dec. 16, 1937   6 Sheets-Sheet 4
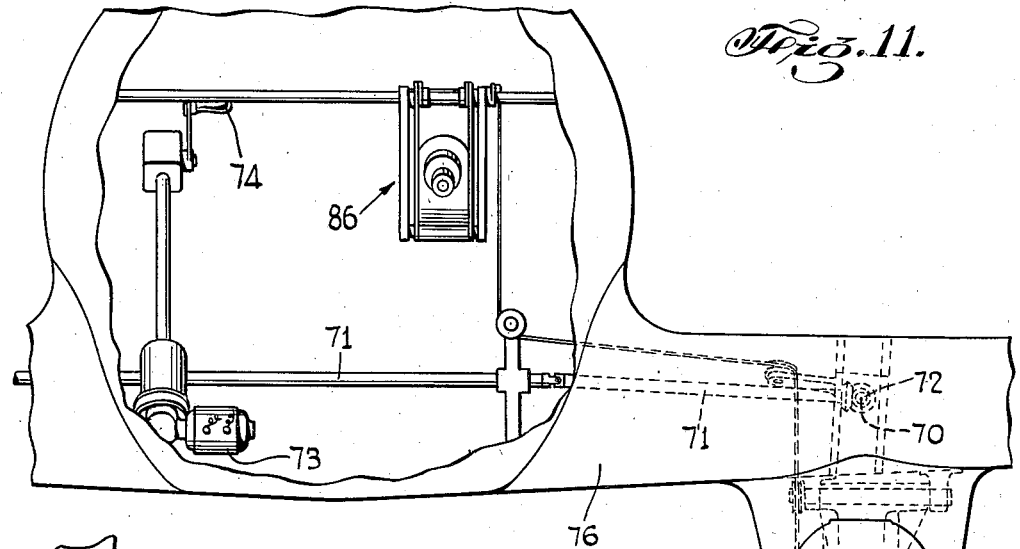
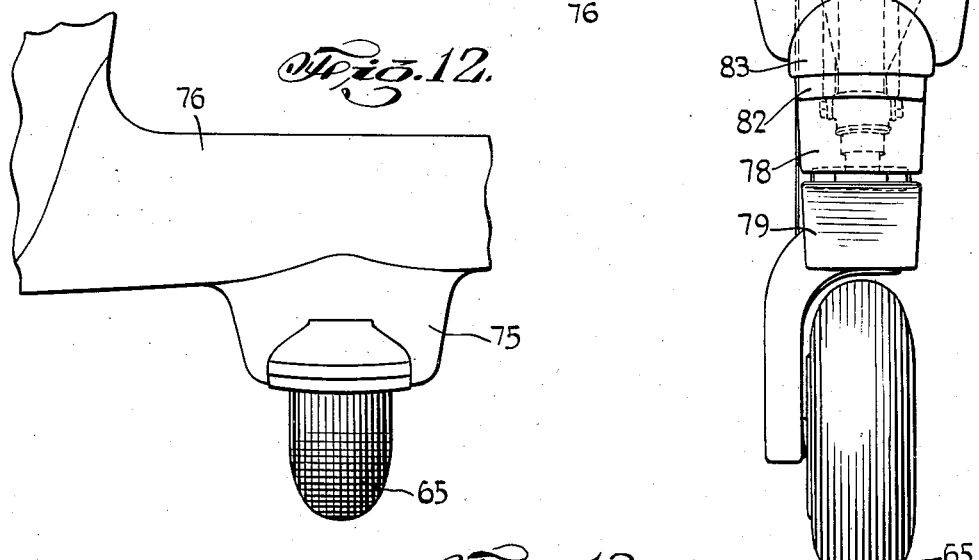
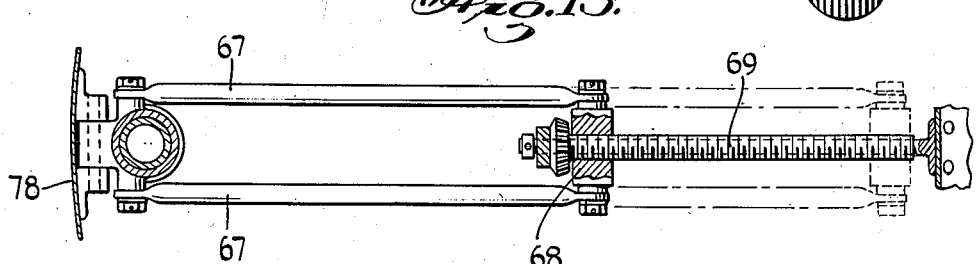
INVENTOR:
ALEXANDER P. de SEVERSKY,
BY
ATTORNEY.

Nov. 21, 1939.  A. P. DE SEVERSKY  2,180,462
AIRCRAFT STRUCTURE
Filed Dec. 16, 1937  6 Sheets-Sheet 5
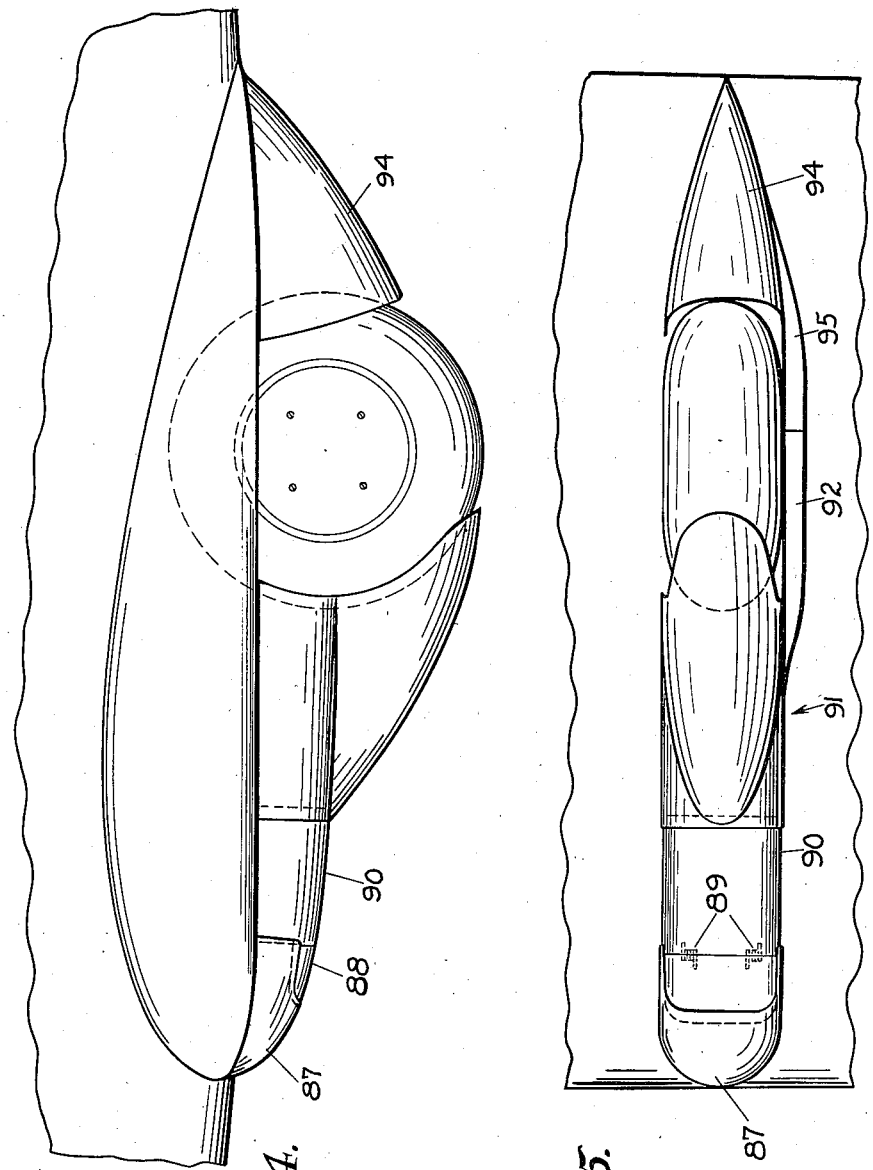
INVENTOR:
ALEXANDER P. de SEVERSKY;
BY:
Robert Rasche
ATTORNEY.

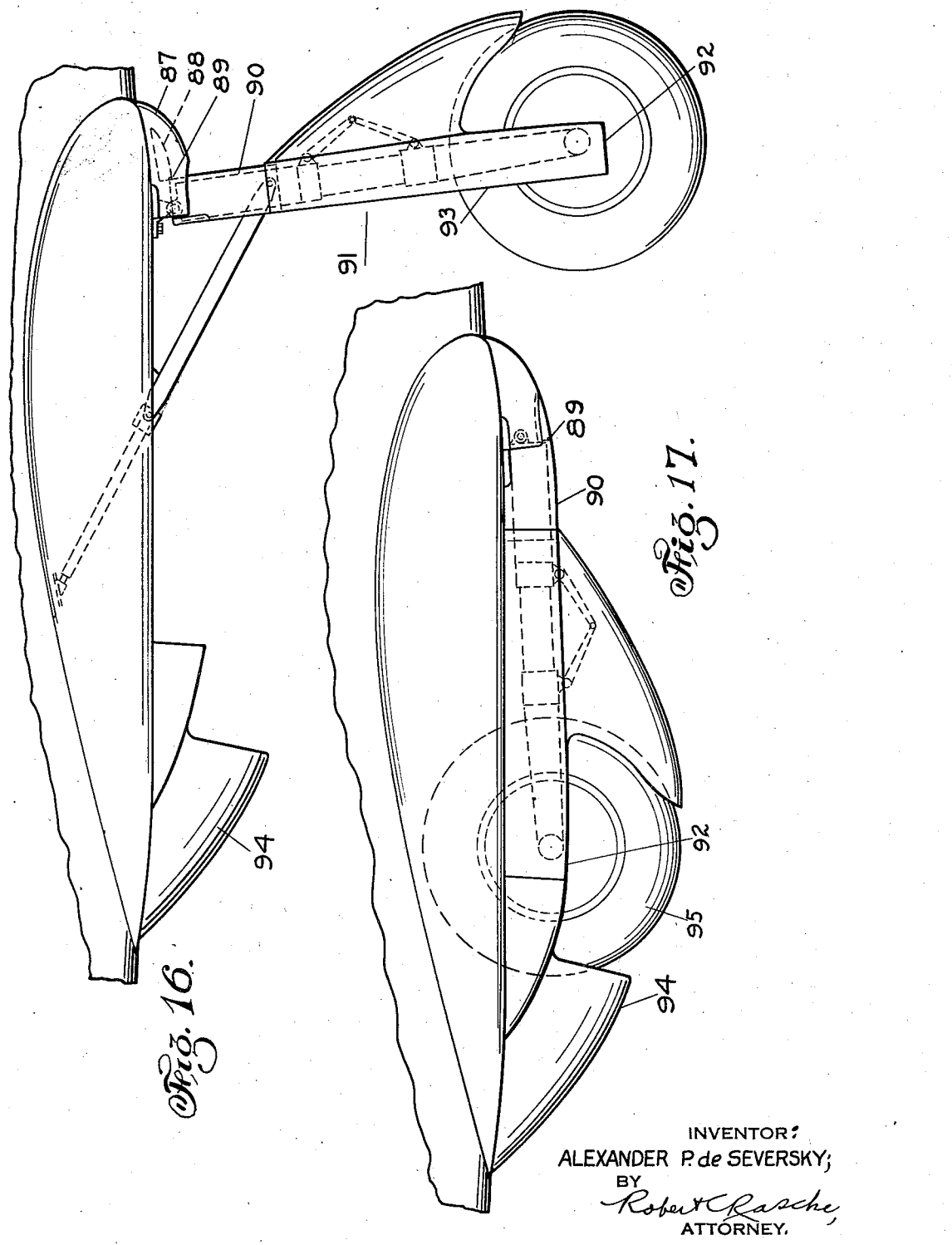

Patented Nov. 21, 1939

2,180,462

UNITED STATES PATENT OFFICE 2,180,462

AIRCRAFT STRUCTURE

Alexander P. de Seversky, Northport, N. Y., assignor to Seversky Aircraft Corporation, a corporation of Delaware Application December 16, 1937, Serial No. 180,077

4 Claims. (Cl. 244—102)

The present invention relates to aircraft and has for an object to provide an improved retractable landing gear.

A further object is to provide streamlining for the landing gear, which will also improve the streamlining of the aircraft as a whole, in order to increase the speed, etc. of the craft.

The landing gear of aeroplanes ordinarily offers a substantial air resistance and reduction of this air resistance increases the speed of the plane and the smoothness of flight. In accordance with the present invention, the landing gear is retracted into a streamline housing at the under side of the wing or fuselage and the housing is closed by streamline closure elements or covers in a manner to provide a minimum of resistance. The streamline closure elements are in part carried by the landing gear itself and are automatically brought to closed flying position when the landing gear is retracted. The mechanism for projecting the landing gear to landing position is of a positively acting type and of such construction that, even if the wheels are not in fully projected position because of accident, they are, nevertheless, fixed in a manner to support the weight of the craft without collapsing or otherwise allowing the craft to be damaged.

The nature and objects of the invention will be better understood from a description of an illustrative embodiment for the purpose of which description reference should be had to the accompanying drawings forming a part thereof, and in which—

Figure 1 is a view in side elevation of one of the two main landing wheels of a landing gear embodying the present invention with its supporting strut and retracting mechanism;

Figure 2 is a bottom plan view of the same showing the landing wheel in retracted position and the streamline housing completely closed;

Figure 3 is a detail view showing the position of the cover elements of the housing in an intermediate position assumed during retraction of the landing gear;

Figure 4 is a view in front elevation of one of the principal landing wheels and associated parts, showing its position with relation to the wing when in landing position;

Figure 5 is a detail view of the rear hinged cover section, taken on the line 5—5 of Fig. 1;

Figure 6 is a diagrammatic view of the operating mechanism for retracting the landing gear;

Figure 7 is a view in front elevation of the housing for one of the main landing gears shown in closed position;

Figure 8 is a sectional view of another embodiment of the invention;

Figure 9 is a bottom plan view of the same showing the landing wheel in retracted position;

Figure 10 is a sectional view taken on the line 10—10 of Fig. 8;

Figure 11 is a view in front elevation of the landing gear shown in Fig. 8;

Figure 12 is a view in front elevation showing the landing wheel in retracted position;

Figure 13 is a sectional detail view taken on the line 13—13 of Fig. 8;

Figure 14 is a side elevation of still another modification, in retracted position;

Figure 15 is a bottom plan view of same;

Figure 16 is an elevation, from the other side, of the modification shown in Fig. 14, with the landing gear extended, and Figure 17 is an elevation, from this same side, of the same modification with the landing gear retracted.

In accordance with the invention, the landing gear is retractable into a suitable housing which is closed to provide a streamline exterior when the landing gear is retracted in order to provide a minimum air resistance.

In the embodiment shown in Figs. 1 to 7, the housing is so formed as to completely enclose the landing wheel and associated mechanism.

In the embodiment shown in Figs. 8 to 13, the landing gear strut is housed within the casing, but the wheel projects partly outside of the casing. The wheel, however, itself is of streamline form to provide a minimum resistance.

Referring more particularly to the embodiment shown in Figs. 1 to 7, in which is shown one of the main landing wheels of a landing gear of the usual three-wheel type, the wheel 5 is carried by a shock absorbing strut 6 which is pivoted at 7 at the underside of the wing 8. The strut 6 is retractable to a horizontal position indicated in dot and dash lines against the underside of the wing 8. The strut 6 is controlled by a pair of links 10 pivoted to the strut and to a nut 11 carried by a screw 12 in the wing. The screw carries a worm wheel 15 at its forward end which is driven by a worm 16. A suitable arrangement for driving the screw 12 is indicated diagrammatically in Fig. 6, wherein the worm 16 is shown as driven from a motor 17 through shafts 18, 19 and 20, which shafts include suitable universal joints to permit the necessary flexibility and which shafts are connected by suitable beveled gearing, as indicated at 20, 21 and 22. The connections for driving the screws for the two similar main landing struts from the shaft 18 are similar and only one need be described or shown in the drawings. When in landing position the strut is moved forward beyond the vertical and the links 10 are in tension when landing. The screw 12 and links 10 are substantially in alignment and, therefore, well positioned to resist stresses in all positions of adjustment. The pitch of the screw is such that the mechanism is irreversible and in the event of landing while the wheels are not completely projected, the stresses will be effectively sustained with the wheels in any position.

It is desirable to provide hand operating mechanism for operating the shaft 18 in event of failure of the motor 17. To this end a suitable crank may be provided. For purposes of illustration a crank 25 is shown diagrammatically as connectible to the shaft 26 by means of a clutch 27 to drive the shaft 18 through beveled gears 28. It will be understood that this arrangement is merely diagrammatic, no attempt being made to indicate the exact position of the hand crank 25.

In the construction illustrated, flap operating mechanism including a shaft 30 is arranged to be driven from the same motor 17 through the beveled gears 20, an additional bevel gear 31, a worm 32 and worm wheel 33 on the shaft 30. Provision is also made whereby connection may be made between the crank 25 and the shaft 30 to drive the same by hand. As diagrammatically shown, this includes a shaft 35 connected by beveled gears 36 to the shaft 30 and a sprocket chain 37 carried by sprocket wheels on the shafts 26 and 35. A clutch 38 provides for connecting the sprocket wheel to the shaft 35. The flap operating mechanism is shown in my co-pending application, Serial No. 101,243, and need not be herein further described, as it is not a part of the invention herein more particularly claimed.

Collars 40 and 41 are carried on the screw 12 at the opposite ends thereof and these collars are provided with lugs which engage corresponding lugs on the nut 11 when the nut reaches the end of its movement.

These collars are connected with suitable mechanism for disconnecting the drive mechanism in order to prevent over-running of the screw at the end of the movement of the landing gear. This mechanism is of known type and therefore need not be further described.

As the landing gear is retracted, it is received in a housing 43 secured to the underside of the wing and faired to provide as smooth a flow of air as is possible for semi-flush landing gear. Closure elements 44, 45, 46 and 47 are provided to completely close the housing when the landing gear is retracted. The closure members 44 and 45 are carried respectively by the wheel yoke 48 and the cylinder 49 of the shock absorber strut, and they are movable relative to each other with such members. As shown, the member 44 is carried by brackets 50 and 51 and projects upwardly to overlap the member 45 carried by the brackets 52 and 53 on the cylinder 49. The yoke 48 is held against rotation relative to the cylinder 49 by means of links 54 and 55 pivoted to each other and to these respective parts. The member 46 is pivoted at 56 in the housing and is yieldably held in closed position by springs 57 (Fig. 4) when the landing gear is retracted. The member 47 is hinged at 58 and movable downwardly and rearwardly to permit the wheel 5 to pass to and from retracted position. In its movement the wheel engages a roller 60 carried by the closure member 47 and causes the member to move downwardly and rearwardly against the tension of a spring 61 which holds the cover in closed position during flight. The movement of the member 47 is indicated in Fig. 3, where the parts are shown in intermediate position.

Figs. 8 to 13 illustrate another embodiment of the invention wherein the landing wheels are not completely enclosed within the fairing. In this embodiment the landing wheel 65 is carried by strut 66 which is retracted by a link 67 connected to the nut 68 on the screw 69. The screw is here shown as driven from a shaft 70 through bevel gears. Shaft 70 and the corresponding shaft for the other landing wheel are driven from a shaft 71 extending along within the leading edge of the wing through bevel gears 72. The shaft 71 may be driven from a motor 73 or from a hand crank 74 by suitable gearing connections which are of usual construction and need not be more particularly described.

In this embodiment of the invention the housing or fairing 75 is provided on the underside of the wing 76 to receive the landing gear strut 66. Closure members 78 and 79 are secured directly to the links 80 and 81 which prevent rotation of the wheel carrying yoke relative to the cylinder of the shock absorber. When the landing gear is retracted the strut is completely extended, thereby bringing the closure members 78 and 79 into substantial alignment. A closure member 82 is carried by the strut 66 in position to suitably cooperate with the closure members 78 and 79. An additional closure member 83 is hinged at 84 to the housing 75 and urged by a suitable spring to substantially horizontal closed position.

The wheel 65 is of streamline shape to provide minimum air resistance both when in projected landing position and when in retracted position in which it projects into the air stream beneath the wing. A wire 85 is shown as connected to the brake of the wheel 65 and to a suitable operating mechanism 86 within reach of the pilot. It will be noted that this wire passes around a guide pulley at the pivot of the landing gear strut 66 in such position that the tension due to the retracting movement of the landing gear is not allowed to become too great. Furthermore, the retracting movement applies a measure of tension to the wire which applies the brake to inhibit useless rotation.

In Figs. 14, 15, 16 and 17 is shown still another embodiment of the invention principles. In this embodiment the wheel, wheel mounting, strut, shock-absorber, and retracting linkage are all essentially the same as in the preceding embodiments, the principal differences lying in the housing on the underside of the wing and in the closure members therefor. The housing comprises a leading-edge cowl 87 encompassing a fixed, rigid closure-plate 88 which is attached to the upper end of the strut group, later to be described, by means of a spring-loaded hinge attachment 89. The upper end of the strut is encased by a fixed continuation, 90, of the member 89. A member 91, constituting a streamline fairing for the strut both when same is in its upper, retracted position, and for the front portion of the wheel when same is in its retracted position, is attached by means of brackets, not shown, but located only at the lower end 92, to encircle the upper portion of the shock-strut and has a portion 93 encasing the fort or cantilever strut of the wheel mounting on one side, only, of the wheel, the other side being left bare, as shown in Fig. 15. The member 91 is not attached to the landing or shock strut on this side, and accordingly can move up and down with the movement of the shock-strut in the oleo.

A boot 94 is provided to the rearward of the retracted position of the wheel, and then serves to continue the streamline flow set up by the forward part of the housing. On one side, the boot bears an excrescence 95 for continuing the fairing 92 in retracted position. The boot 94 is usually made relatively small and shallow, and has its orifice slanted backwardly at quite an angle; there is thus a minimum of likelihood that it will, when the wheel and tail are down for landing, thus leaving the boot open, scoop up much debris, such as weeds, snow or mud, from the landing field.

I claim:

1. In an aircraft, the combination with a wing of a retractable landing gear comprising a strut with a wheel carried thereby, said strut being pivoted to move downward and forward to landing position and upward and rearward to a retracted position against the under surface of the main wing structure, a streamline housing on the underside of the wing to receive said strut, closure members carried by the strut arranged to form a streamline closure for the housing when the strut and landing wheel are in retracted position, said strut comprising a hydraulic cylinder, and a plunger movable therein, a pair of links pivoted to each other and each pivoted to one of the members to prevent relative rotation of the plunger and cylinder, and a second closure member pivoted to the wing aft of the wheel when in retracted position and arranged to be moved by movement of the wheel to retracted position to permit the wheel to pass to and from retracted position.

2. In an aircraft, the combination with a wing of a retractable landing gear comprising a strut with a wheel carried thereby, said strut being pivoted to move downward and forward to landing position and upward and rearward to a retracted position against the under surface of the main wing structure, a streamline housing on the under surface of the wing to receive said strut when retracted, a streamline closure for said housing comprising a closure section carried by the strut and a pivoted section hinged to the housing at a point forward of the strut pivot and arranged to cooperate with said first mentioned closure section when the strut is retracted to close the housing.

3. In an aircraft, the combination with a wing of a retractable landing gear comprising a strut with a wheel carried thereby, said strut being pivoted to move downward and forward to landing position and upward and rearward to a retracted position against the under surface of the main wing structure, a streamline housing on the under surface of the wing to receive said strut when retracted, a streamline closure for said housing comprising a closure section carried by the strut, a pivoted section hinged to the housing at a point forward of the strut pivot and arranged to cooperate with said first mentioned closure section when the strut is retracted to close the housing and a closure section pivoted to the housing at a point aft of the wheel when in retracted position and movable downwardly and rearwardly when engaged by the wheel to permit the wheel to pass to and from retracted position.

4. In an aircraft, a retractable landing gear including a strut carrying a landing-wheel, said strut being pivoted to move downward and forward to landing position and upward and rearward to retracted position, a housing on the body of the craft including a leading-edge cowl having its rear edge indented, and a boot having a lateral excrescence, a fairing section fixed to the upper portion of said strut to swing forwardly into said indentation when the wheel is down, a closure member for closing said indentation when the wheel is up, and a fairing member attached to the lower end of said strut and having a portion for streamlining same both when the strut is extended and when it is retracted and for streamlining said wheel, in conjunction with said boot, when the wheel is retracted.

ALEXANDER P. DE SEVERSKY.